(12) United States Patent
Chen

(10) Patent No.: US 8,595,865 B2  
(45) Date of Patent: Dec. 3, 2013

(54) HAND-WEARING ASSEMBLY

(76) Inventor: Yi-Yi Chen, Yuan Lin Chen (TW)

(*) Notice: Subject to any disclaimer, the term of this patent is extended or adjusted under 35 U.S.C. 154(b) by 342 days.

(21) Appl. No.: 13/049,986

(22) Filed: Mar. 17, 2011

(65) Prior Publication Data

US 2011/0235310 A1 Sep. 29, 2011

(51) Int. Cl.
*A41D 19/00* (2006.01)

(52) U.S. Cl.
USPC .................................. 2/160; 2/161; 2/162

(58) Field of Classification Search
USPC ........... 2/159, 160, 161.1, 170, 162; 359/879, 359/838, 871, 515, 516, 517; D11/1–19, D11/86–94
See application file for complete search history.

(56) References Cited

U.S. PATENT DOCUMENTS

| 4,863,239 | A | * | 9/1989 | Malone | 359/879 |
| D335,263 | S | * | 5/1993 | Willis | D11/3 |
| 5,361,169 | A | * | 11/1994 | Deal | 359/838 |
| 5,694,261 | A | * | 12/1997 | Deal | 359/879 |
| 2008/0259477 | A1 | * | 10/2008 | Gorton et al. | 359/879 |
| 2011/0235310 | A1 | * | 9/2011 | Chen | 362/103 |

* cited by examiner

*Primary Examiner* — Gloria Hale  
(74) *Attorney, Agent, or Firm* — Alan Kamrath; Kamrath IP Lawfirm, P.A.

(57) ABSTRACT

A hand-wearing assembly has a main body and a side mirror mount. The main body is a loop and has a connecting top. The side mirror mount is connected with and stands on the connecting top. The side mirror mount has a mirror face facing a rear end of the connecting top and is capable of being connected with a side mirror. The side mirror mount allows the side mirror to stand above a wrist or a back of a hand. Accordingly, a rider can see a rear sight at ease via the standing side mirror. With a slight movement of the hand, the position of the side mirror is easily adjusted to enable the rider to see all the rear area from all directions, or to check the positions of the following cyclists.

7 Claims, 8 Drawing Sheets

HAND-WEARING ASSEMBLY

BACKGROUND OF THE INVENTION

1. Field of the Invention

The present invention relates to a hand-wearing assembly and, more particularly, to a hand-wearing assembly on which a side mirror can stand.

2. Description of Related Art

Problems that a rider may encounter when riding a bicycle or a motorcycle are as follows:

1. Difficult adjustment of a position of a side mirror:

Because the side mirror is mounted securely on the bicycle or the motorcycle, the position of the side mirror cannot be adjusted, or is difficult to be adjusted to a precise position for the rider to see the backward condition, such as a following cyclist.

2. Difficult adjustment of a position of an illuminative device:

Like the side mirror, the illuminative device is mounted securely on the bicycle or the motorcycle. The position of the illuminative device cannot be adjusted, or is difficult to be adjusted toward a desired illuminative direction.

To overcome the shortcomings, the present invention provides a hand-wearing assembly to mitigate the aforementioned problems.

SUMMARY OF THE INVENTION

The main objective of the invention is to provide a hand-wearing assembly on which a side mirror can stand.

A hand-wearing assembly has a main body and a side mirror mount. The main body is a loop and has a connecting top. The side mirror mount is connected with and stands on the connecting top. The side mirror mount has a mirror face facing a rear end of the connecting top and is capable of being connected with a side mirror. The side mirror mount allows the side mirror to stand above a wrist or a back of a hand. Accordingly, a rider can see a rear sight at ease via the standing mirror. With a slight movement of the hand, the position of the side mirror is easily adjusted to enable the rider to see all the rear area from all directions, or to check the positions of the following cyclists.

Other objectives, advantages and novel features of the invention will become more apparent from the following detailed description when taken in conjunction with the accompanying drawings.

DETAILED DESCRIPTION OF PREFERRED EMBODIMENTS

Figure 1:
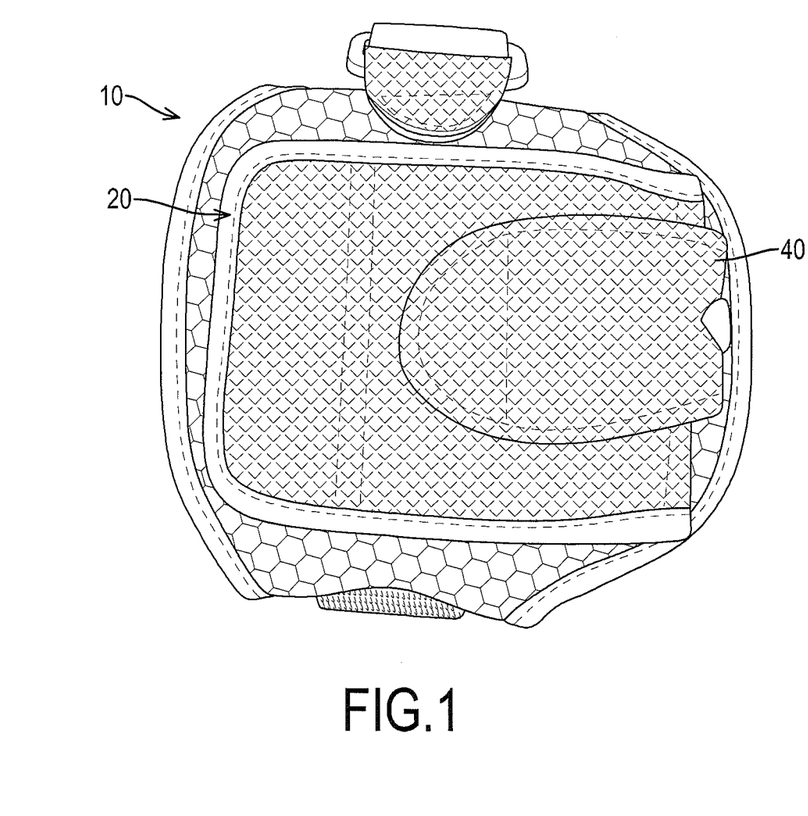
FIG. 1 is a top view of a first embodiment of a hand-wearing assembly in accordance with the present invention.
Figure 2:
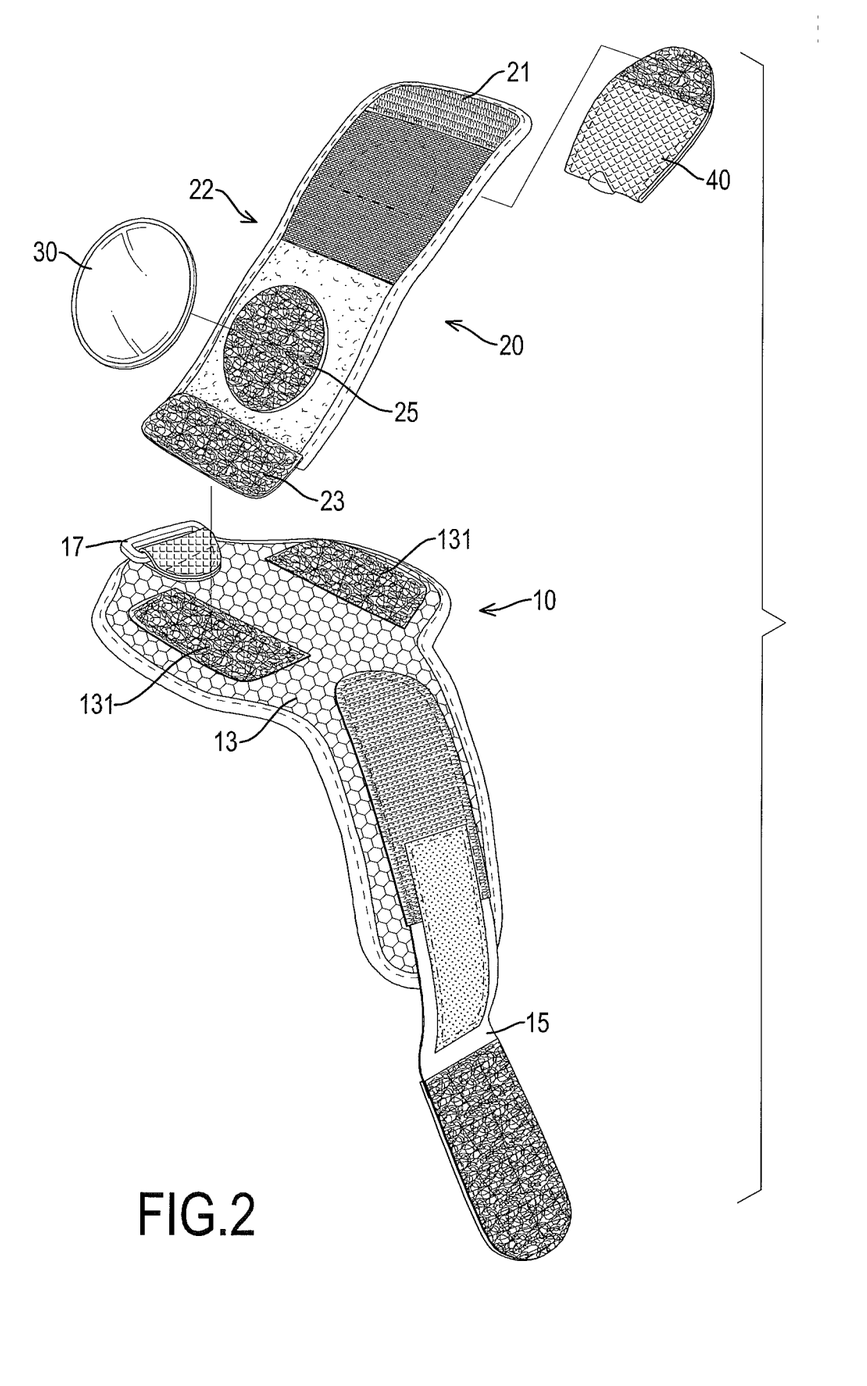
FIG. 2 is a partially exploded perspective view of the hand-wearing assembly in FIG. 1.
Figure 3:
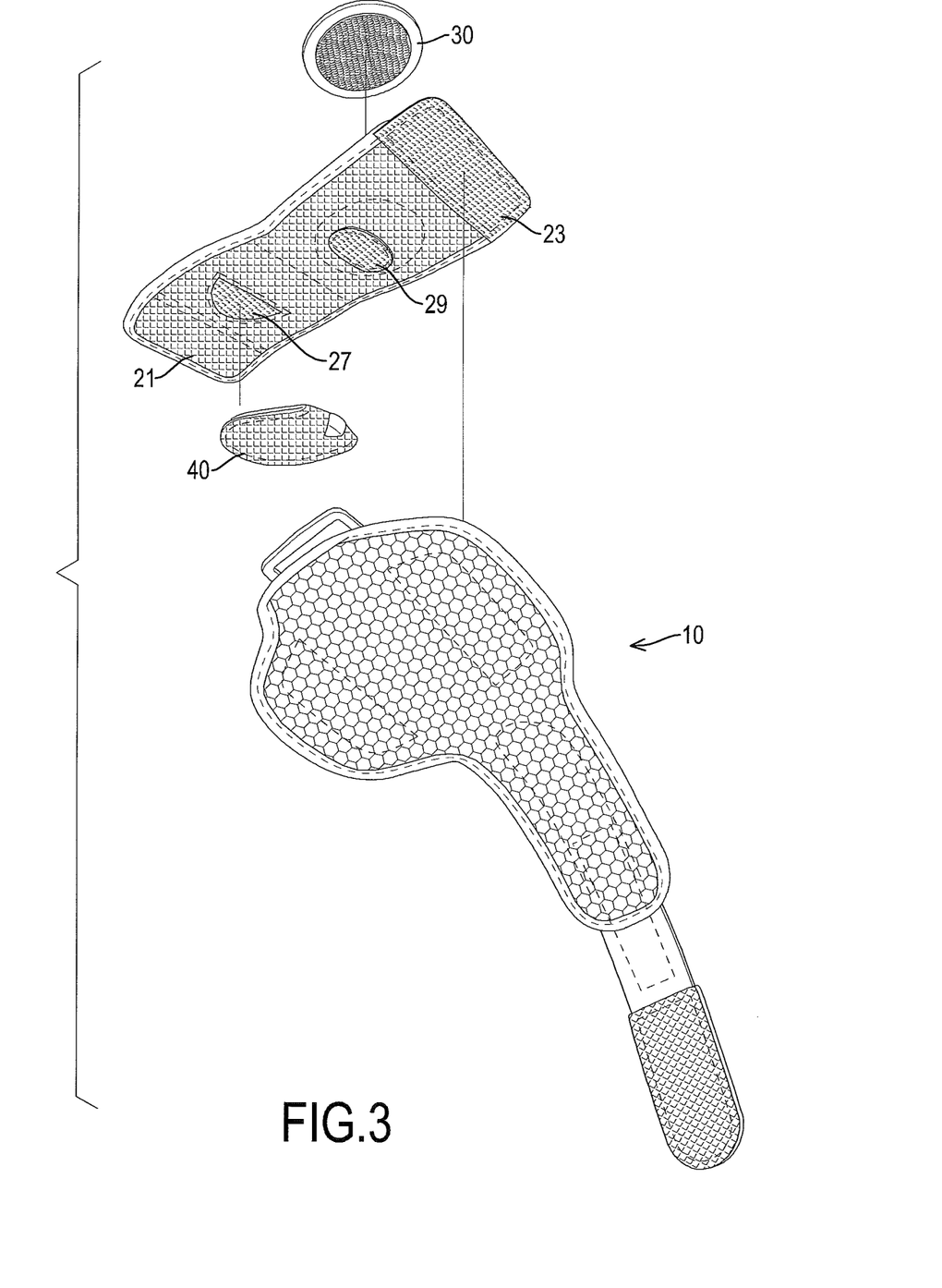
FIG. 3 is another partially exploded perspective view of the hand-wearing assembly in FIG. 1.

With reference to FIGS. 1 to 3, a first embodiment of a hand-wearing assembly in accordance with the present invention comprises a main body 10, a side mirror mount 20, a side mirror 30 and an LED (light emitting diode) assembly 40.

The main body 10 is a loop and has two ends, a wearing hole and a connecting top 13. The wearing hole is formed through the main body 10 to allow a rider to wear the hand-wearing assembly on a wrist or a hand. The connecting top 13 is formed on the main body 10 above the wearing hole and has a front end and a rear end opposite to the front end of the connecting top 13.

Preferably, the connecting top 13 has two connecting areas 131 respectively formed at the front end and the rear end of the connecting top 13. Preferably, the main body 10 is a wristlet having a ring 17 and a belt 15. The ring 17 is connected to one of the ends of the main body 10. The belt 15 is connected to the other end of the main body 10 and is mounted through the ring 17 to form the wearing hole with the main body 10.

Figure 4:
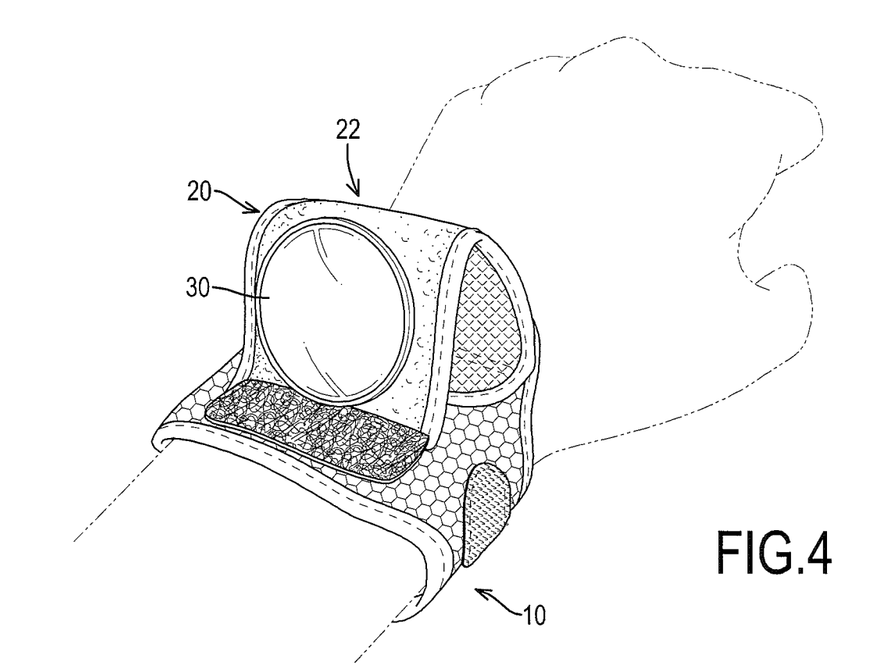
FIG. 4 is an operational perspective view of the hand-wearing assembly in FIG. 1.

With reference to FIGS. 2 to 4, the side mirror mount 20 is detachably connected with and selectively stands on the connecting top 13 of the main body 10. Preferably, the side mirror mount 20 is a pad bent for standing, is triangular while in the standing position and has a bent part 22, a front end 21, a rear end 23, an inner surface, an outer surface, a mirror face 25, an LED area 27 and a combining area 29. A length of the side mirror mount 20 is approximately twice that of the connecting top 13. The bent part 22 is opposite to the connecting top 13.

The front ends 21 and the rear end 23 of the side mirror mount 20 are respectively and detachably connected with the front end and the rear end of the connecting top 13 in a hook-and-loop adhesive way. The rear end 23 of the side mirror mount 20 is detachably connected with the connecting area 131 that is formed at the rear end of the connecting top 13. The rear end 23 has a connector formed on the inner surface of the side mirror mount 20 and connected with the corresponding connecting area 131, and a connector formed on the outer surface of the side mirror mount 20 above the connector of the rear end of the side mirror mount 20. The front end 21 of the side mirror mount 20 is selectively connected with the rear end 23 of the side mirror mount 20 and has a connector formed on the outer surface of the side mirror mount 20 to connect with the connector of the rear end 23 of the side mirror mount 20. The hook-and-loop adhesive connection may be conventional, and a detailed description is omitted. The ends 21,23 of the side mirror mount 20 may be stitched securely on the connecting top 13. Alternately, one of the ends 21,23 of the side mirror mount 20 is stitched on the connecting top 13 and the other of the ends 21,23 is connected with the connecting top 13 in the hook-and-loop adhesive way. As long as the side mirror mount 20 can be connected with and stand on the connecting top 13, the present invention does not limit the format of how the side mirror mount 20 is connected with the connecting top 13.

The mirror face 25 faces the rear end of the connecting top 13.

The LED area 27 is formed at the inner surface of the side mirror mount 20, is opposite to the mirror face 25 and is adjacent to the front end of the connecting top 13.

The combining area 29 is formed at the inner surface of the side mirror mount 20 at a position beside the LED area 27, is adjacent to the bent part 22 of the side mirror mount 20, is opposite to the mirror face 25 and is capable of being connected with the connecting area 131 located at the front end of the connecting top 13 in a hook-and-loop adhesive way.

With reference to FIGS. 1 and 4, the side mirror 30 is a convex, stands and leans relative to a horizontal plane, and is detachably connected with the mirror face 25 in a hook-and-loop adhesive way.

The LED assembly 40 is detachably connected with the LED area 27 in a hook-and-loop adhesive way.

With reference to FIG. 1, when the first embodiment of the present invention is not in use, the ends 21,23 of the side mirror mount 20 are connected with each other in a hook-and-loop adhesive way to hold the side mirror 30 inside the folded side mirror mount 20. The folded side mirror mount 20 wraps and protects the side mirror 30 from being rubbed. The combining area 29 is connected with the connecting area 131 located at the front end of the connecting top 13 to secure the side mirror mount 20 on the main body 10.

Figure 5:
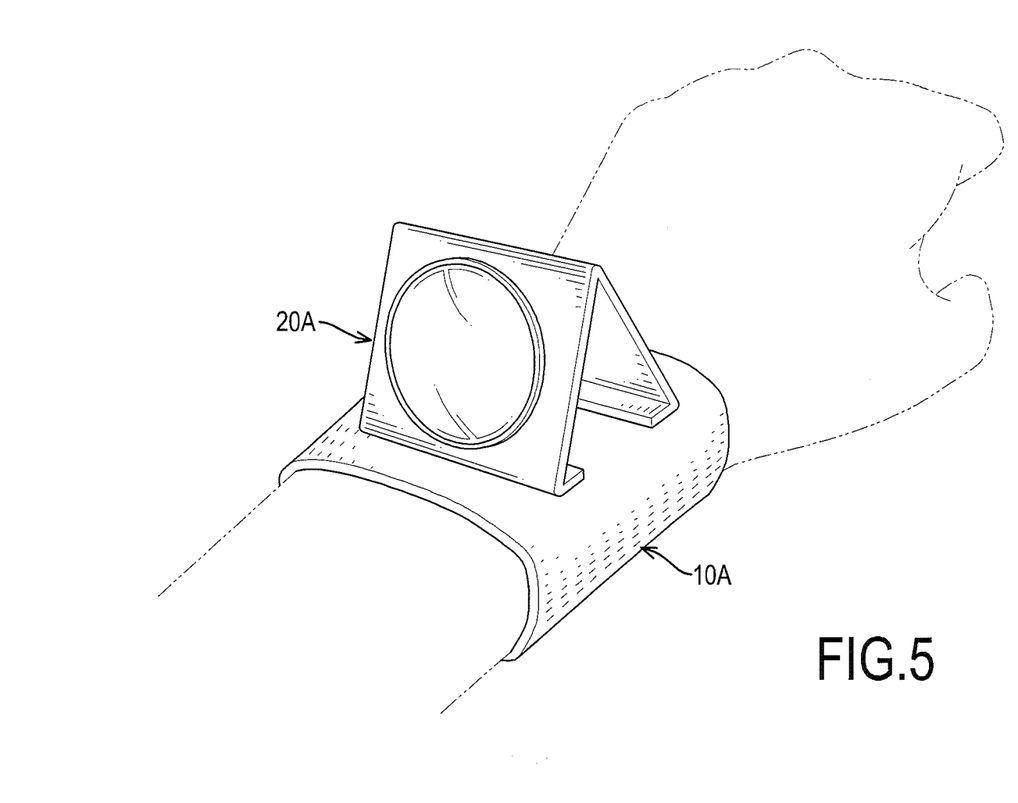
FIG. 5 is an operational perspective rear view of a second embodiment of the hand-wearing assembly in accordance with the present invention.

With reference to FIG. 5, a second embodiment of the hand-wearing assembly in accordance with the present invention is substantially the same as the first embodiment except that the main body 10A is a knitted wristband on which the side mirror mount 20A is stitched.

Figure 6:
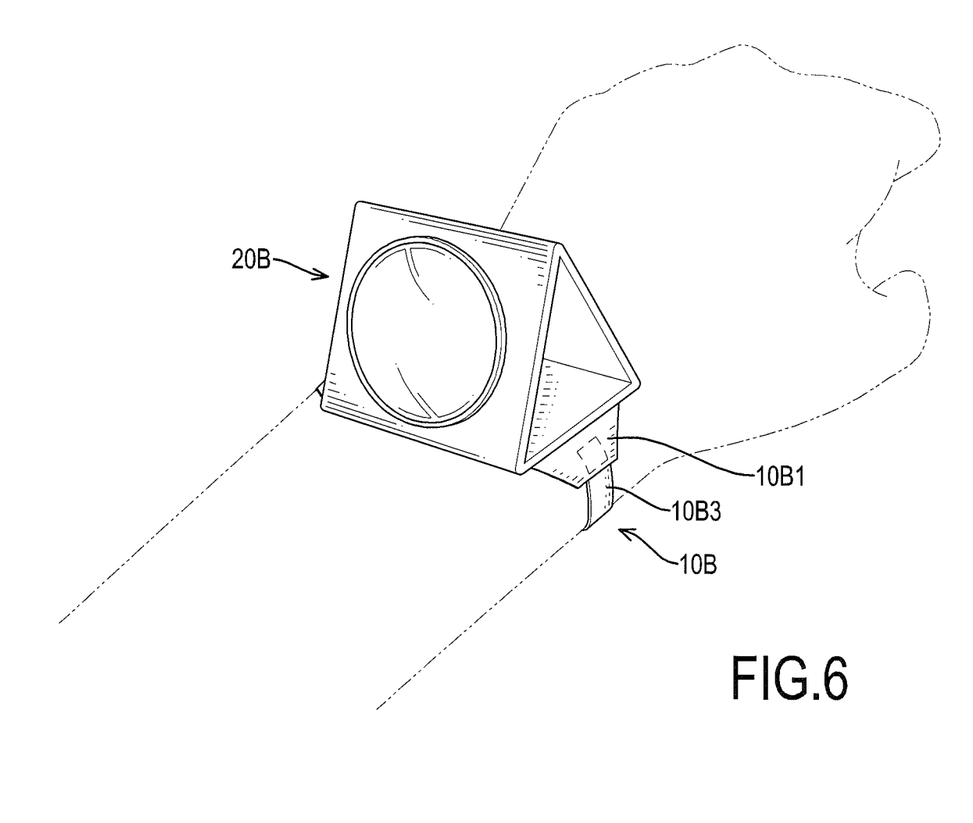
FIG. 6 is an operational perspective rear view of a third embodiment of the hand-wearing assembly in accordance with the present invention.

With reference to FIG. 6, a third embodiment of the hand-wearing assembly in accordance with the present invention is substantially the same as the first embodiment except that the main body 10B has a solid plate 10B1 and an elastic band 10B3. The solid plate 10B1 serves as the connecting top 13 of the first embodiment. The elastic band 10B3 has two ends respectively and securely connected with the solid plate 10B1. The side mirror mount 20B of the third embodiment is a solid frame mounted securely on the solid plate 10B1.

Figure 7:
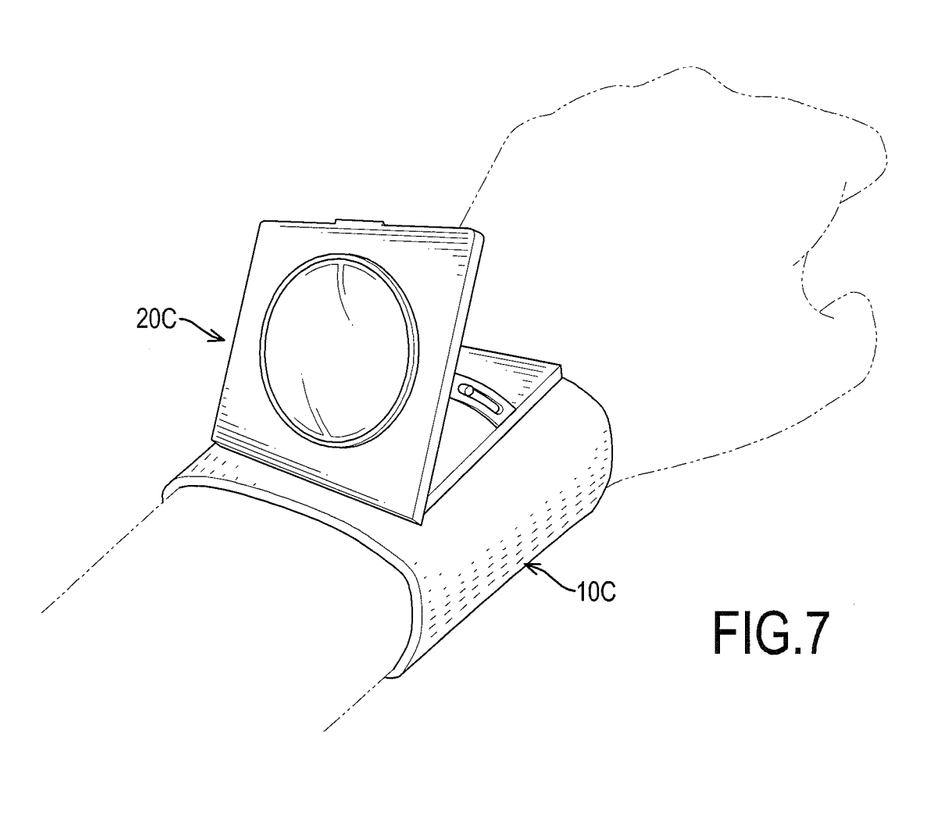
FIG. 7 is an operational perspective rear view of a fourth embodiment of the hand-wearing assembly in accordance with the present invention.
Figure 8:
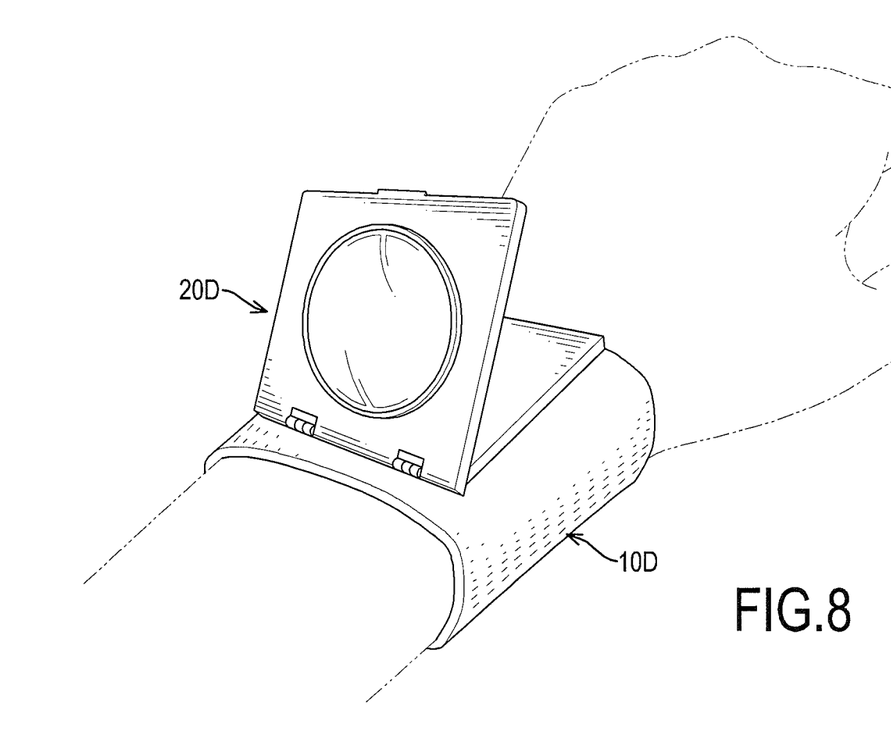
FIG. 8 is an operational perspective rear view of a fifth embodiment of the hand-wearing assembly in accordance with the present invention.

With reference to FIGS. 7 and 8, a fourth embodiment and a fifth embodiment of the hand-wearing assembly in accordance with the present invention are substantially the same as the second embodiment except the side mirror mounts 20C, 20D are different. The side mirror mount 20C of the fourth embodiment is a V-shaped bracket mounted on the main body 10C and has an inclined surface. The side mirror mount 20C may be made of plastics or metal. The side mirror mount 20D of the fifth embodiment has two plates, a pivot, a torsion spring and a fastening device. The pivot is mounted through edges of the plates. The torsion spring is mounted around the pivot and has two ends respectively abutting the plates. The fastening device is mounted in an inner side of the side mirror mount 20D. The side mirror mount 20D of the fifth embodiment is mounted on the main body 10D.

From the above description, it is noted that the present invention has the following advantages:

1. Adjustable side mirror 30:

The side mirror mount 20, 20A, 20B, 20C allows the side mirror 30 to stand above the wrist or the back of the hand. When the hand holds a handle bar of a bicycle, the wrist or the back of the hand spontaneously humps and further makes the side mirror 30 lean to form an inclined angle, such as 45 degrees relative to a horizontal plane. Accordingly, a rider can see the rear sight at ease via the leaning side mirror 30. With slight movement of the hand, the position of the side mirror 30 is easily adjusted to enable the rider to see all the rear area from all directions, or to check the positions of the following cyclists.

2. Detachable side mirror 30:

Because the side mirror 30 and the side mirror mount 20 are detachable from the main body 10, the main body 10 can be washed without causing damage to the side mirror 30. Additionally, the side mirror 30 is easily replaced or carried by the rider.

3. Protected side mirror 30:

Because the side mirror mount 20 of the first embodiment is foldable, the side mirror 30 can be wrapped and protected by the side mirror 30 from being rubbed.

4. Adjustable LED assembly 40:

Like the side mirror 30, the position of the LED assembly 40 is easily adjusted by the movement of the hand to change the illuminative direction of the LED assembly 40.

5. Detachable LED assembly 40:

Because the LED assembly 40 is detachable, the main body 10 can be washed without causing damage to the LED assembly 40. Additionally, the LED assembly 40 is easily replaced or carried by the rider.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hand-wearing assembly comprising:
   a main body being a loop and having
      two ends;
      a wearing hole formed through the main body to allow a rider to wear the hand-wearing assembly on a wrist or a hand;
      a connecting top formed on the main body above the wearing hole and having
         a front end;
         a rear end opposite to the front end of the connecting top; and
         two connecting areas respectively formed at the front end and the rear end of the connecting top;
      a ring connected to one of the ends of the main body; and
      a belt connected to another end of the main body and mounted through the ring to form the wearing hole with the main body; and
   a side mirror mount detachably connected with and selectively standing on the connecting top of the main body and having
      an inner surface facing the connecting top of the main body;
      an outer surface;
      a mirror face formed on the outer surface of the side mirror mount and selectively facing the rear end of the connecting top;
      a rear end detachably connected with the connecting area that is formed at the rear end of the connecting top and having
         a first connector formed on the inner surface of the side mirror mount and connected with the corresponding connecting area; and
         a second connector formed on the outer surface of the side mirror mount above the first connector of the rear end of the side mirror mount;
      a front end selectively connected with the rear end of the side mirror mount to cover the mirror face and having a first connector formed on the outer surface of the side mirror mount to connect with the second connector of the rear end of the side mirror mount; and a side mirror detachably connected with the mirror face of the side mirror mount.

2. The hand-wearing assembly as claimed in claim 1, wherein:
   the side mirror mount is a pad bent for standing and has a bent part opposite to the connecting top between the front end and the rear end of the side mirror mount.

3. The hand-wearing assembly as claimed in claim 2, wherein:
   the side mirror mount has a combining area formed at the inner surface of the side mirror mount, adjacent to the bent part of the side mirror mount and opposite to the mirror face.

4. The hand-wearing assembly as claimed in claim 3, wherein
   the side mirror mount has a light emitting diode area formed at the inner surface of the side mirror mount except the combining area with a third connector; and
   the hand-wearing assembly further has a light emitting diode assembly detachably connected with the light emitting diode area and having a fourth connector connected with the third connector of the light emitting diode area.

5. The hand-wearing assembly as claimed in claim 1, wherein the main body is a wristlet.

6. The hand-wearing assembly as claimed in claim 4, wherein the main body is a wristlet.

7. The hand-wearing assembly as claimed in claim 4, wherein the main body is a wristband.

\* \* \* \* \*